United States Patent
Bruce et al.

(10) Patent No.: US 9,841,616 B1
(45) Date of Patent: Dec. 12, 2017

(54) MOBILE SYSTEM INCORPORATING FLEXIBLE AND TUNABLE ANTI-REFLECTIVE SKIN AND METHOD OF USE

(71) Applicant: Sunlight Photonics Inc., Edison, NJ (US)

(72) Inventors: Allan James Bruce, Scotch Plains, NJ (US); Sergey Frolov, Murray Hill, NJ (US); Michael Cyrus, Castle Rock, CO (US)

(73) Assignee: SUNLIGHT PHOTONICS INC., Edison, NJ (US)

( * ) Notice: Subject to any disclaimer, the term of this patent is extended or adjusted under 35 U.S.C. 154(b) by 0 days.

(21) Appl. No.: 15/382,276

(22) Filed: Dec. 16, 2016

Related U.S. Application Data

(63) Continuation-in-part of application No. 15/375,495, filed on Dec. 12, 2016, which is a continuation of
(Continued)

(51) Int. Cl.
*G02F 1/01* (2006.01)
*G02B 1/11* (2015.01)
(Continued)

(52) U.S. Cl.
CPC .............. *G02F 1/0131* (2013.01); *G02B 1/11* (2013.01); *G02F 1/0121* (2013.01);
(Continued)

(58) Field of Classification Search
CPC ........ G02F 1/0131; G02F 1/0128; G02F 1/01; G02F 1/0121; G02B 1/11; G02B 1/111;
(Continued)

(56) References Cited

U.S. PATENT DOCUMENTS

| 3,552,826 A | 1/1971 | Hanes et al. |
| 3,706,485 A | 12/1972 | Fawcett et al. |

(Continued)

FOREIGN PATENT DOCUMENTS

| EP | 0664893 A1 | 8/1995 |
| EP | 0945254 B1 | 12/2004 |

(Continued)

OTHER PUBLICATIONS

O'Brien et al., "Advanced Receivers for Free-space Optical Communications", Proc. SPIE 5614, 129-138, 2004.
(Continued)

*Primary Examiner* — Bumsuk Won
*Assistant Examiner* — Wen Huang
(74) *Attorney, Agent, or Firm* — Stuart H. Mayer; Mayer & Williams PC

(57) ABSTRACT

A mobile system includes a self-supporting platform, a tunable anti-reflective (AR) skin or film disposed on and secured to the mobile platform, one or more actuators and a controller. The tunable AR skin or film includes one or more layers that are at least partially transmitting to optical energy at one or more optical wavelengths. The skin or film is substantially flexible and/or stretchable and has an optical AR to incident electromagnetic radiation of a given wavelength which is selectively variable when flexed and/or stretched. The actuators are able to flex and/or stretch the skin or film in response to receipt of a control signal. The controller generates the control signal based on a measured value of the electromagnetic radiation transmitted through the tunable AR skin or film.

29 Claims, 6 Drawing Sheets

Related U.S. Application Data application No. 15/281,337, filed on Sep. 30, 2016, now abandoned, which is a continuation of application No. 15/213,500, filed on Jul. 19, 2016, now abandoned, which is a continuation of application No. 14/466,935, filed on Aug. 22, 2014, now abandoned.

(51) Int. Cl.
*H04B 10/61* (2013.01)
*H04B 10/116* (2013.01)
*H04N 5/232* (2006.01)

(52) U.S. Cl.
CPC ......... *H04B 10/116* (2013.01); *H04B 10/615* (2013.01); *H04N 5/232* (2013.01)

(58) Field of Classification Search
CPC .... G02B 1/115; H04B 10/116; H04B 10/615; H04N 5/232
USPC .................................................. 359/237–239
See application file for complete search history.

(56) References Cited

U.S. PATENT DOCUMENTS

| | | |
|---|---|---|
| 3,799,653 A | 3/1974 | Ikeda |
| 4,937,134 A | 6/1990 | Schrenk et al. |
| 5,783,049 A | 7/1998 | Bright et al. |
| 5,939,189 A | 8/1999 | Phillips et al. |
| 6,366,013 B1 | 4/2002 | Leenders et al. |
| 6,926,952 B1 | 8/2005 | Weber et al. |
| 6,999,156 B2 | 2/2006 | Chou et al. |
| 7,304,781 B2 | 12/2007 | Chang-Hasnain et al. |
| 8,433,207 B2 | 4/2013 | Shin et al. |
| 8,977,084 B2 | 3/2015 | Hulsey |
| 2002/0186928 A1 | 12/2002 | Curtis |
| 2005/0117866 A1 | 6/2005 | Park et al. |
| 2010/0062217 A1 | 3/2010 | Kurematsu |
| 2010/0098430 A1 | 4/2010 | Chui |
| 2010/0150511 A1 | 6/2010 | Arsenault et al. |
| 2010/0245978 A1 | 9/2010 | Baumberg et al. |
| 2012/0262789 A1 | 10/2012 | Xie et al. |
| 2013/0004711 A1 | 1/2013 | Doi et al. |
| 2013/0279004 A1 | 10/2013 | Foland et al. |
| 2013/0344290 A1 | 12/2013 | Yu |

FOREIGN PATENT DOCUMENTS

| | | |
|---|---|---|
| WO | 99/36262 | 7/1999 |
| WO | 2007/079149 A2 | 7/2007 |
| WO | 2010062217 A1 | 6/2010 |
| WO | 2013083624 | 6/2013 |

OTHER PUBLICATIONS

Karp et al., "Planar Micro-optic Solar Concentrator", Optics Express, 18, 1122-33, 2010.
Bouchard et al., "Graded-index Planar Waveguide Solar Concentrator", Optics Lett., 39, 1197-1200, 2014.
Price et al., Wide-angle Planar Micro-tracking for Quasi-Static Microcell Concentrating Photovoltaics, Nature Comm., DOI 10.1038/ncomms7223, 2015.
Horwath et al., Broadband Backhaul Communication for Stratospheric Platforms, Proc. SPIE 6304, 2006.
Henniger et al., An Introduction to Free Space Optical Communications, Radio Engineering, 19, 203-212, 2010.
Carrasco-Casado et al., Free Space Laser Communications with UAVs, NATO-OTAN, RTO-MP-IST-099, P7, 2009.
Garlington et al., Analysis of Free Space Optics as a Transmission Technology, US Army Information Systems Engineering Command, WP AMSEL-IE-TS-05001, Mar. 2005.
Y. Li & C.Henry, Silicon Optical Bench Waveguide Technology, Optical Fiber Telecomm.IIIB, 319-76, Kaminow & Koch, Academic Press 1997.
Nanfang Yu, IEEE Journal of Selected Topics in Quantum Electronics, vol. 19, No. 3, May/Jun. 2013 Flat Optics: Controlling Wavefronts With Optical Antenna Metasurfaces.
Jose M. Castro, Energy collection efficiency of holographic planar solar concentrators, Applied Optics / vol. 49, No. 5 / Feb. 10, 2010.
C. Schlick, An inexpensive BRDF model for physically-based rendering, Computer Graphics Forum 13, 233, 1994.
Moghal et al., High performance, single-layer, anti-reflective optical coatings comprising mesa-porous silica nanoparticles, Appl. Mater. Interfaces, 4, 854-9, 2011.
Paivanranta et al., A wide-angle anti-reflection surface for the visible spectrum, Nanotechnology, 20, 375301, 2009.
Guldin et al., Self-cleaning antireflective optical coatings, Nano Lett., 13, 5329-35, 2013.
Fang et al., Nanoparticle stacks with graded indices Enhance the Omnidirectional Light Harvesting of Solar Cells and the Light Extraction of Light-Emitting Diodes, Adv. Functional Mat., 23, 1412-21, 2013.
Perl et al., Ultra broadband and wide-angle hybrid antireflection coatings with nanostructures, J. Photovoltaics, 4, 962-7, 2014.
Orlovskiy et al., Broadband dielectric mirrors, for optical diagnostics in ITER, Fusion Energy and Design, 88, 1284-7, 2013.
Karagodsky et al., Theoretical analysis of sub-wavelength high contrast grating reflectors, Optics Express, 18, 16973-82, 2010.
Hao et al., Broadband compact reflector based on all-dielectric sub-wavelength nanoparticle chains, Optical Engineering, 52, 068001, 2013.
Ricciardi et al., Broadband mirrors in the near-infrared based on sub-wavelength gratings in SOI, IEEE Photonics Journal, 2, 696-702, 2010.
Haley Birch, How to disappear completely, Chemistry World, 42-45, Jun. 2010.
Griggs et al.,Dynamic optical tags, Proc. SPIE 5441, 151-60, 2004.
Sumriddetchkajorn et al., High-dynamic-range, high-optical-isolation, wavelength-sensitive, thin film filter-based, variable fiber optic attenuator, Optical Engineering 45, 035004, 2006.
Li et al., "Broadband compact reflector based on all-dielectric subwavelength nanoparticle chains: reflecting lights beyond normal incidence with a very high reflectivity" SPIE Optical Engineering, 12 pages, Aug. 8, 2014.

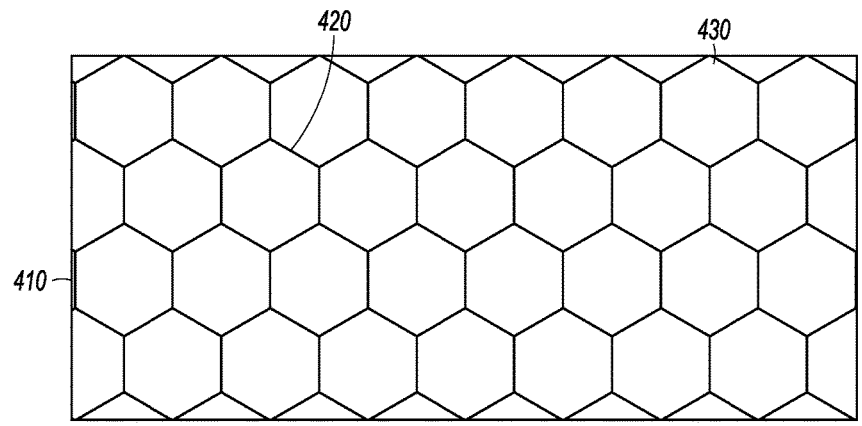
FIG. 4
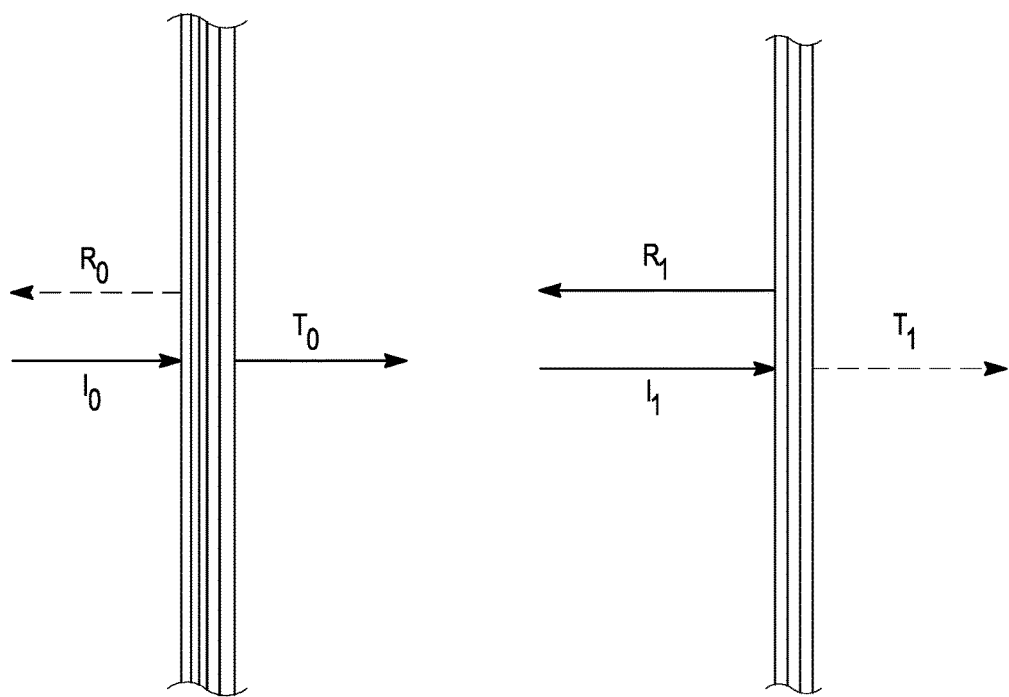
FIG. 5A
FIG. 5B

MOBILE SYSTEM INCORPORATING FLEXIBLE AND TUNABLE ANTI-REFLECTIVE SKIN AND METHOD OF USE

CROSS REFERENCE TO RELATED APPLICATION

This application is a continuation-in-part of U.S. application Ser. No. 15/375,495, filed Dec. 12, 2016, entitled, "FLEXIBLE AND TUNABLE ANTI-REFLECTION SKIN" which is a continuation of U.S. application Ser. No. 15/281,337, filed Sep. 30, 2016, entitled "FLEXIBLE AND TUNABLE ANTI-REFLECTION SKIN" which is a continuation of U.S. application Ser. No. 15/213,500, filed Jul. 19, 2016, entitled "FLEXIBLE AND TUNABLE ANTI-REFLECTION SKIN", which is a continuation of U.S. application Ser. No. 14/466,935, filed Aug. 22, 2014, entitled "FLEXIBLE AND TUNABLE ANTI-REFLECTION SKIN", the contents of which is incorporated herein in its entirety by reference.

FIELD OF INVENTION

The present invention relates to a system, or device, which incorporates a free standing, or supported, skin which is flexible and exhibits tunable, or settable, anti-reflective (AR) behavior to incident light when the skin is stretched, flexed or otherwise deformed.

BACKGROUND

Untethered, unmanned mobile systems are increasingly employed for missions on land, sea and in the air. Current unmanned systems typically employ Radio Frequency (RF) communications for system management and mission operations. Unmanned systems sometimes include on-platform photovoltaic (PV) cells which convert incident solar energy to electrical energy which is then used to power platform, or payload, operations. They may also include optical systems for imaging, mapping or other sensing functions. Additionally, free space optical (FSO) communication links to and/or from the platforms have been demonstrated in a few instances. FSO directional communication links can operate with lower latency, higher bandwidth and longer range than conventional RF links and are an area of increasing interest in the unmanned system community. Any optical device such those mentioned above which makes use of optical energy that is provided to it will be referred to herein as an optical receiving device.

In regard to optimizing the performance of on-platform optical receiving devices it is desirable to optimize the characteristics (e.g. the optical intensity) of incoming light which passes through the surface of the device. A significant, and frequently detrimental, effect can be the diminution of signal intensity because of reflection losses at the interface of the device. This can be due to the refractive index mismatch between the device and its surroundings, surface structure, or other effects. Antireflective (AR) technology is frequently used to minimize such interface reflection losses. AR implementation typically involves the engineering of coating layers, and/or surface structures which can be applied to individual, or multiple, optical receiving devices.

SUMMARY

In one aspect, the invention provides skins or films that are mechanically durable and which exhibit settable or tunable optical AR characteristics when subject to changes in shape or physical dimensions. Embodiments include skins with stacked sub-wavelength layers and nano-, or micro-, structures which experience dimensional changes and exhibit changeable AR characteristics when the skins are stretched, flexed or otherwise changed in shape. In their original state the skins should be at least partially, transmitting to underlying optical receiving devices.

The skins or films may be distinguished from conventional AR solutions in that they are designed to be mechanically durable and alter their AR characteristics when stretched or flexed. In this regard the materials, structure and optical design are selected, or engineered, such that any critical values of dimension, refractive index or other essential characteristics are achieved during deformation.

A variety of flexible and transparent base materials including polymers and fluoro-polymers and standard engineering and design methods may be employed to achieve the desired characteristics. The latter includes single- or multi-layer structures, doped, composite and nano-structured layers or surfaces. The achievable AR characteristics are appropriate for a wide range of devices.

In another aspect, the invention provides a mobile system that includes a self-supporting platform, a tunable AR skin or film disposed on and secured to the mobile platform, one or more actuators and a controller. The tunable AR skin or film includes one or more layers that are at least partially transmitting to optical energy at one or more optical wavelengths. The skin or film is substantially flexible and/or stretchable and has an optical AR to incident electromagnetic radiation of a given wavelength which is selectively variable when flexed and/or stretched. The actuators are able to flex and/or stretch the skin or film in response to receipt of a control signal. The controller generates the control signal based on a measured value of the incident electromagnetic radiation transmitted through the tunable skin or film.

In some situations, multiple incorporated optical receiving devices may be required to operate at different wavelengths, or light intensities, and in continuous, intermittent or periodic modes. System performance during missions of unmanned mobile systems, for instance, may benefit from the active adjustment of these parameters, in response to variations in range, environmental conditions or other operational requirements. Existing AR solutions for specific optical devices are typically engineered for use in a specific environment (e.g. temperature, humidity and pressure) and may not remain optimized if these environmental conditions change, or if the optical system incorporates different optical receiving devices, requiring different wavelength, intensity or other operating characteristics. In many instances, unmanned mobile systems are likely to encounter environmental variations in use and likely to include a multiplicity of different optical devices with different operational requirements with the evolution of more complex missions. The systems and methods described herein for actively tuning the AR characteristics of a skin deployed on, or over, underlying optical receiving devices on a mobile platform can be used to address these problems by actively tuning the skin while in-use in response to environmental variations or different optical receiving device requirements.

Embodiments of the present invention, summarized above and discussed in greater detail below, can be understood by reference to the illustrative embodiments of the invention depicted in the appended drawings. It is to be noted, however, that the appended drawings illustrate only typical embodiments of this invention and are therefore not to be

BRIEF DESCRIPTION OF THE DRAWINGS

FIG. 4 shows a top plan view of one example of an unmanned, aerial system (UAV) airfoil having an open-frame structure over which a tunable AR skin may extend.

FIGS. 5(a) and 5(b) show a schematic representation of a tunable AR multi-layer skin, with an optical interference stack.

DETAILED DESCRIPTION

Introduction

Figure 1:
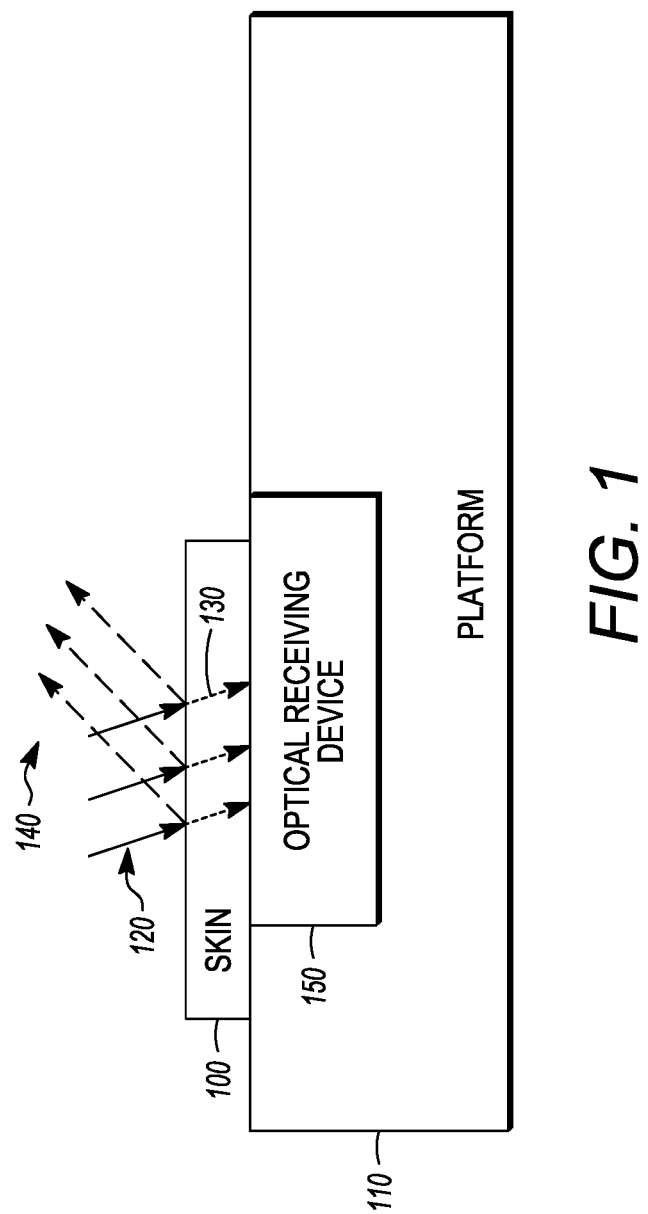
FIG. 1 shows one example of a tunable AR skin that extends over a mobile platform and over an underlying optical receiving device.

As explained in more detail below, a flexible and tunable optically AR skin can be deployed on, or at, the surface of, or within, a mobile platform to enable the dynamic tuning of incoming, and/or outgoing light, or optical signals to an optical receiving device for the purpose of optimizing or enhancing its performance. The optical performance parameters being optimized or enhanced will depend on the functionality of the optical receiving device. Such functionality may include, without limitation, optical sensing, communications and/or optical imaging. Furthermore, the system in which such a skin is employed, may include means to actively monitor, analyze and adjust the AR behavior of the skin to attain a desired performance in use.

Such skins may have a variety of structures, be fabricated from a variety of materials and constructed by various means. They may be designed and implemented for a single function or have multiple functionality including multi-optical, structural, electrical, protection or other functions. Changes in the AR behavior of the skin may be achieved by changing the periodicity, aspect ratio or other characteristic of grating or interferometric layered structures in the skin. These changes may be uniformly or non-uniformly applied by flexing, stretching or physically deforming the reflective skin under an applied stimulus. Changes in environment conditions e.g. temperature may also effect changes. The range of achievable AR behavior may be in the range of 0-100%. In some embodiments the starting AR without any applied stimulus may be a high value e.g. 90% with the option of positive and/or negative adjustment.

A number of uses are illustrated below for the tunable optically AR skin, which may be provided on various mobile vehicles and other mobile systems, including, without limitation, unmanned aerial systems (UAVs), marine systems, ground systems and wearable systems. In these applications the AR behavior of the skin is actively tuned, with the goal of optimizing the performance of an underlying optical receiving device, or multiple devices, on a mobile platform. Specific means are incorporated to measure, analyze and actively adjust the AR behavior of skin during use to enable dynamic tuning for optimizing system performance in a given application.

The means of altering AR behavior may involve the use of actuators activated by thermal (heating, cooling), piezo-electric, magnetic, electro-active, pneumatic and hydraulic means, for instance, embedded in at least one layer of the skin. Such elements may be used to induce expansion or contraction effects which produce flexing, stretching or deformation of the skin and thus produce a change in reflectivity. Changes to AR behavior can also be effected by inducing deformation of the skin by changing the dimensions of a skin-supporting frame by mechanical or other means. Changes in AR behavior can also be effected by inducing pressure changes under a skin which is sealed to a supporting frame which also provides an underlying cavity in which the pressure can be adjusted below or above the external ambient pressure.

To access the intended benefits of the skin it is important to be able to actively monitor, analyze and subsequently adjust the AR behavior of the skin when it is incorporated into a mobile system or device.

The monitoring of AR behavior may be performed on the same platform as the device. AR monitoring may be achieved indirectly by monitoring the performance of (an) optical receiving device(s) or additional optical receiving detector(s) underlying the skin, to uncalibrated incoming light, or signals. More quantitative monitoring may be achieved by using a calibrated source of incoming light, (e.g. a local light source on the same platform), a skin with defined transmittance characteristics, and a calibrated optical receiver device underlying the skin. In this way the actual value of the transmittance and/or reflectance of the skin can be calculated at any given time.

Optical receiving devices for monitoring, referred to herein as optical monitoring devices, will typically provide an electrical output to ancillary readout or analysis systems. The output of these systems can then be fed directly, or remotely e.g. via an RF wireless link, to a control system on the platform which controls the AR behavior adjusting mechanism of the skin. Such a feedback loop provides the basis for tuning and optimizing the AR performance of the skin. Standard methodologies such as dithering can also be applied for performance optimization.

FIG. 1 shows an example of a tunable AR skin 100 that extends over a mobile platform 110. The skin 100 may extend over the entirety of the platform or, as shown, just a portion thereof. For instance, if the mobile platform 110 is an aircraft, the skin 100 may extend over the aircraft wings and/or the fuselage. In some embodiments the mobile platform 110 may be incorporated in a mobile vehicle such as an automobile, aircraft or ship. The surface of the platform 110 on which the skin 100 extends may be planar or non-planar. Moreover, in some embodiments the mobile platform 110 may be an open frame, with the skin 100 only secured to the frame at its edges. That is, in this embodiment there may not be any supporting structure above or below the skin 100.

Incident light 120 on the skin 100 is at a minimum partially, transmitted through the skin as transmitted light 130, and partly reflected 160. The transmitted light 130 is received by an optical receiving device 150, which underlies the skin. The intensity of transmitted light 130 which is incident on the surface of the optical receiving device is determined by the AR behavior of the skin and by the transmittance through the skin 100.

Figure 2:
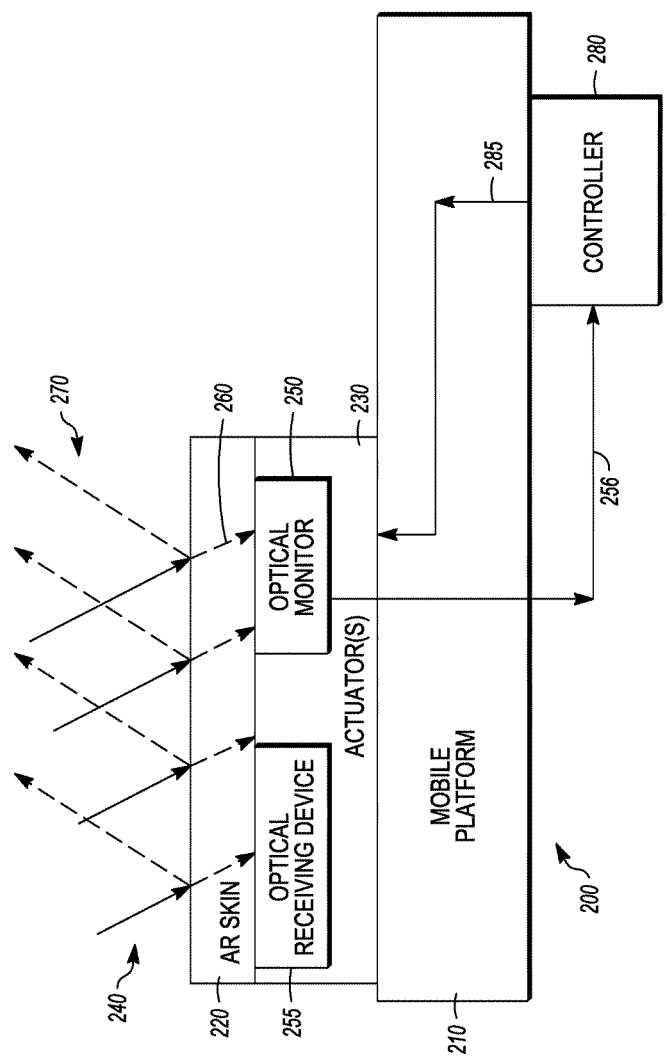
FIG. 2 shows a simplified schematic diagram of one example of a mobile system that includes a mobile platform on which a tunable AR skin is located.

FIG. 2 shows a simplified schematic diagram of one example of a mobile system 200 that includes a mobile platform 210 on which a tunable AR skin 220 is located. One or more actuators 230 or other activated elements are located below the tunable AR skin 220 for flexing and/or stretching the skin 220. Incident light 240 on the skin is partially transmitted through the skin as transmitted light 260 and partially reflected by the skin as reflected light 270. An optical receiving device 255 is also underlying the skin for receiving light 260 transmitted through the skin 220. The performance of the optical receiving device 255 is optimized or enhanced by the flexing and/or stretching of the skin 220. A signal 256 from an optical monitor 250 that also underlies the skin is indicative of the intensity of light received after transmission through the skin 220. The signal 256 is sent to a controller 280. The controller 280 may be located on the mobile platform 210 or elsewhere in the mobile system 200. In response, the controller 280 generates a control signal 285 that is provided to the actuators 230 to thereby cause the flexing and/or stretching of the skin 220 and the consequent change in the AR behavior of the skin 220, in order to optimize the characteristics of the transmitted light reaching the optical receiving device 255. It should be noted that in some embodiments the functionality of the optical monitor 250 may be incorporated into the optical receiving device 255.

Instead of or in addition to monitoring the optical energy transmitted through the AR skin, in some embodiments it may be desirable to measure one or more optical performance parameters of the optical receiving device and then adjust the AR characteristics of the AR skin in order to optimize or enhance those performance parameters. The particular performance parameter(s) being optimized or enhanced will depend on the particular type of optical receiving device that is employed. Illustrative examples of such performance parameters will be discussed in the use cases presented below.

Figure 3:
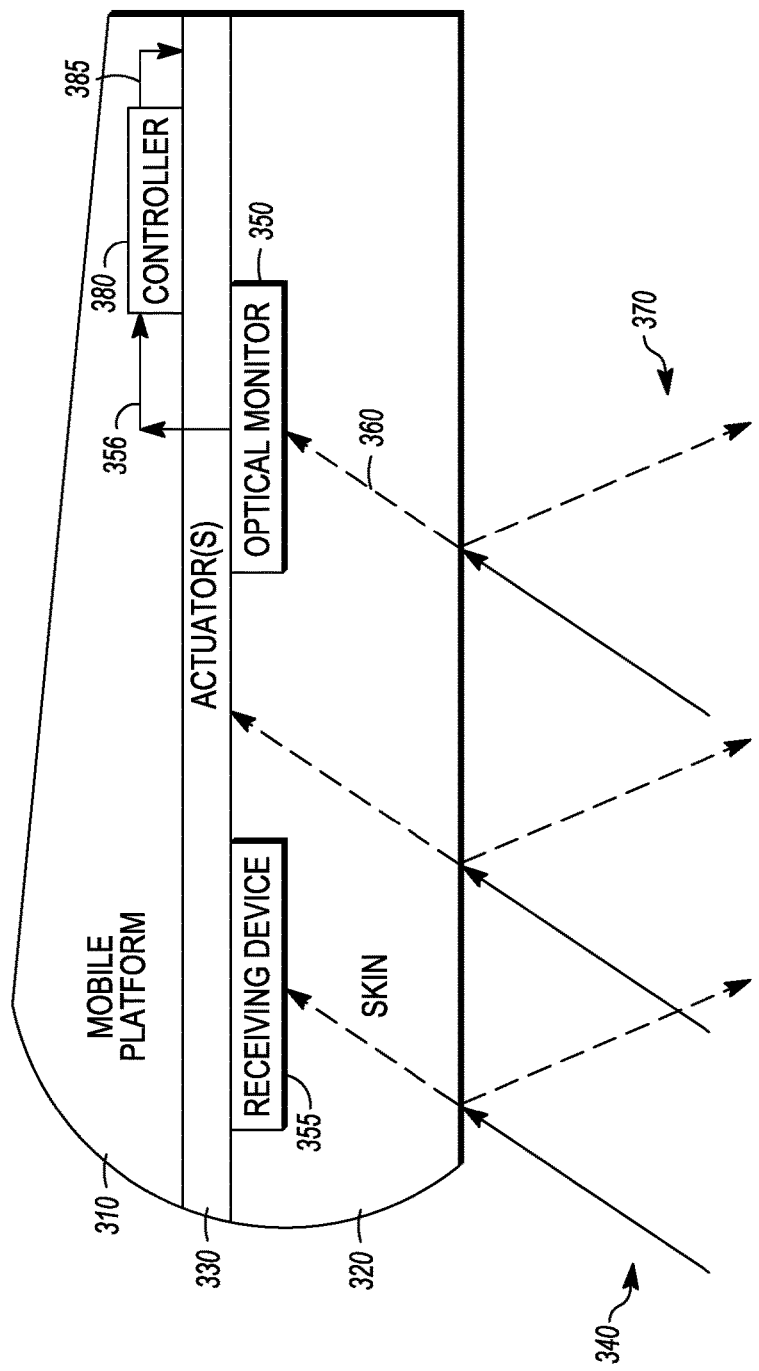
FIG. 3 shows a simplified schematic diagram of another example of a mobile system that includes an unmanned, aerial system (UAV) airfoil on which a tunable AR skin is located.

FIG. 3 shows a simplified schematic diagram of another example of a mobile system 300, which in this example is a UAV. A tunable AR skin 320 is located on an underside of a UAV airfoil 310, which is shown in cross-section. One or more actuators 330 or other activated elements are located between the skin 320 and the airfoil 310 for flexing and/or stretching the skin 320. In this case incoming light 340 from below is incident on the AR skin 320. The incident light 340 is partly transmitted through the skin as transmitted light 360 and partially reflected by the surface of the skin as reflected light 370. The transmitted light 360 is incident on both an underlying optical receiving device 355 and optical monitor 350. An output signal from the optical monitor 350 is routed to an analyzer/controller 380. In response, the controller 380 generates a control signal 385 that is provided to the actuators 330 to thereby cause the flexing and/or stretching of the skin 320 and the consequent change in the AR behavior of the skin 320, in order to optimize the characteristics of the transmitted light reaching the optical receiving device 355. In other embodiments the control signals 385 may be transmitted using RF or optical communication links.

FIG. 4 shows a top plan view of the UAV airfoil 410, which in this example has an open frame with a honeycomb internal structure defined by struts 420. Each region 430 between the struts 420 can serve as individual regions in which the skin can be locally deformed independently of the other regions to produce selective tuning of the reflective properties of the skin.

Illustrative examples of tunable AR skins that may be employed in the mobile systems discussed above will now be presented.

Tunable AR Skins

The discrete AR skins may have physical structures which are resilient to significant mechanical or functional degradation or failure when stretched and, or flexed in the course of deployment or use. They may be comprised of ductile materials, if a single deployment is sufficient, or elastic materials if repeated or continuous bi-directional modification is required during use. In cases where the skin is comprised of multiple-layers the physical properties of the constituent layers should be sufficiently similar to maintain the integrity of the skin under conditions of use without mechanical, or functional, degradation. Examples of suitable skin materials include standard polymeric materials which meet the requirements of the application.

The preferred skins may comprise appropriate materials or surfaces to be able to function as discrete elements, such as structural skins, or to interface with supporting structures or surrounding media, as well as interfacing with the underlying optical receiving devices. Such interfacing may be achieved in a number of conventional ways by chemical, thermal, mechanical, electrical or other means and may include optional surface layers or materials to assist the interfacing process. Examples of such surface layers include layers comprised of standard adhesives.

The AR skins may have any of a number of transverse structures which enable the desired AR behavior. They may be comprised of mono-layers, which have constant, graded or varied refractive index. They may be comprised of a multi-layer where the layers have an engineered progression of refractive index. They may include nano-composite layers or nano-structured surfaces which may provide a wider range of engineered refractive index profiles than dense or single material layers. The skins may incorporate an interference stack of materials which change AR behavior when subject to flexing and stretching. The skins may also include grating structures, including sub-wavelength gratings, which exhibit varying AR behavior when stretched or flexed.

FIGS. 5(*a*) and 5(*b*) show a schematic representation of a multi-layer skin, with an optical interference stack. In the initial state, shown in FIG. 5(*a*), the film exhibits significant AR behavior and incident light ($I_0$) is partially transmitted ($T_0$) through the skin and partially reflected ($R_0$). When stretched, as shown in FIG. 5(*b*) the dimension of the interference stack is reduced, potentially also changing the refractive index of the materials, and the structure can become more, reflective to incident light ($I_1$) and in the extreme case is substantially reflected ($R_1$) with little or no transmission ($T_1$). Conversely, the structure may be designed to be more reflective in its initial state and less reflective when stretched. The structure can also be designed to produce intermediate levels of transmission and reflection for a defined range of deformation.

Figure 6A:
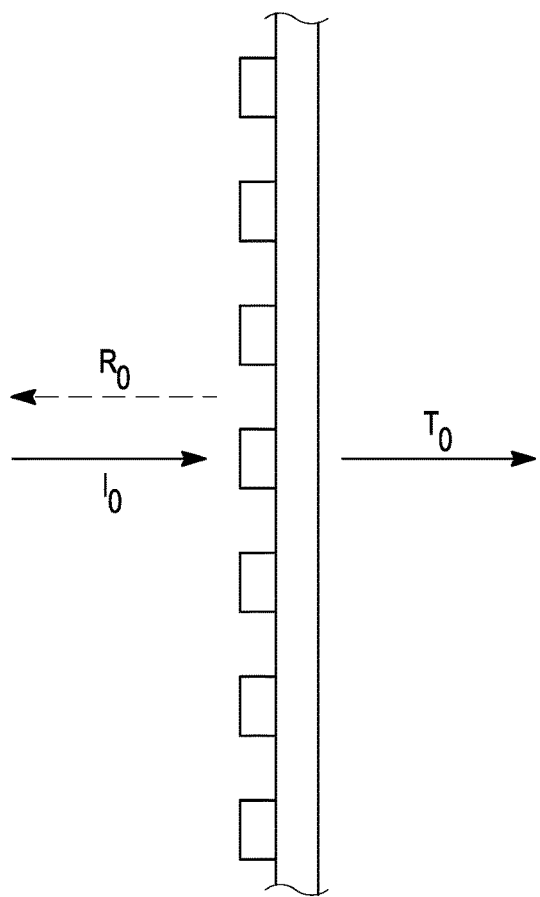
FIGS. 6(a) and 6(b) show another schematic representation of a tunable AR skin, with a 1D grating on the surface.
Figure 6B:
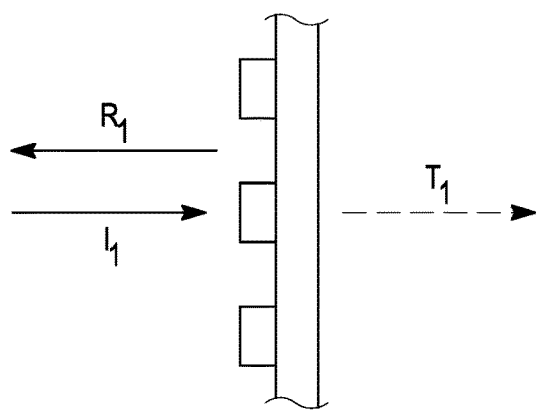

FIGS. 6(*a*) and 6(*b*) shows an analogous representation of a skin, with a 1D grating on the surface. As shown in an un-stretched condition of FIG. 6(*a*) the skin may be designed to have significant AR behavior. When, the skin is stretched in FIG. 6(*b*) the dimension and periodicity of the grating changes and may exhibit lower AR behavior. The skin may also be designed for the reverse behavior and intermediate performance. When the skin is flexed it can be simultaneously stretched or compressed in various regions which can produce more complex, but predictable, AR behavior.

Figure 7:
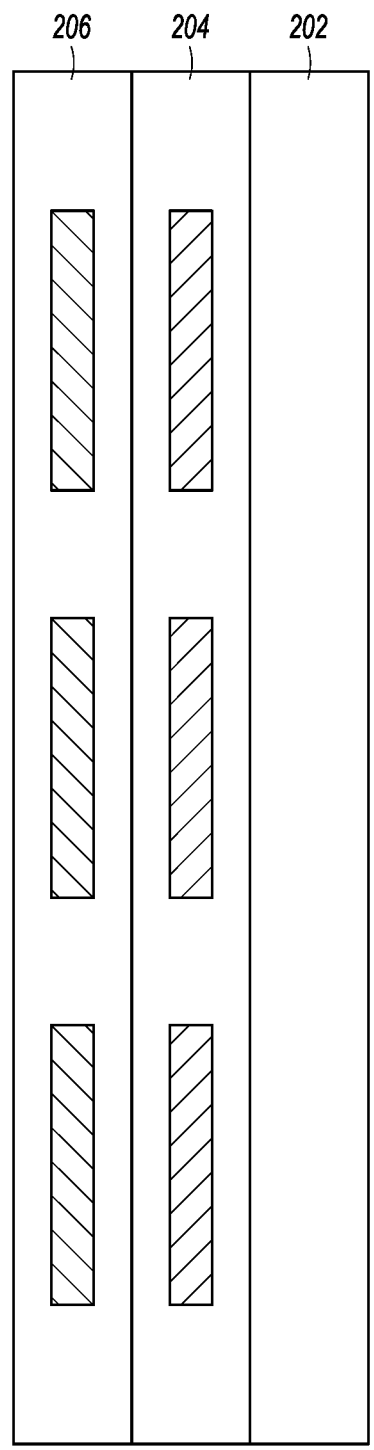
FIG. 7 shows an example of a tunable AR skin having a plurality of layers.

FIG. 7 shows a skin having a plurality of layers 202, 204 and 206, layers 204 and 206 include structured gratings. As further shown, layer 204 is sub-surface layer.

Materials with suitable mechanical and optical properties include various polymers which are appropriately, elastic, or ductile and optically transmissive. Depending on the optical structure employed they should also be suitable for chemical, or structural, modifiable to provide index variations, for patterning, or loading with a high index particles, including nano-particles. Examples include polymers which are polyethelene or polypropylene or fluoro-polymers such as ETFE and PVDF and structural or compositional modifications thereof, including composites, loaded with other materials or phases. Within a range the ETFE and modified derivatives can exhibit elastic behavior. The flexible skin should be sufficiently transmitting under the conditions of use for the desired electromagnetic frequencies which may be in the ultra-violet, visible or infra-red regions of the spectrum. Embodiments with specular or diffuse reflective performance may be preferred.

In some embodiments, the thickness, and AR behavior of the respective layers or structures in the flexible skin should be in a range that changes in these parameters induced by stretching or flexing during deployment, or use, are sufficient to significantly alter the AR behavior of the skin from its performance prior to deformation.

In another embodiment, a multi-layer skin, with an optical interference stack as shown in FIG. 1 is provided. Such a skin may consist of alternating layers of ETFE, with different levels of high-index, nano-particle material loading to establish a desired index contrast. In the unperturbed state this skin may be substantially transparent. When stretched the periodicity of the interference stack will change and result in a change in the AR behavior of the skin. The structure may initially be partially reflective and exhibit a change in AR behavior when stretched. The changes could be gradual or stepped in nature. If the skin is flexed, one surface may be stretched and the opposite surface compressed, producing more complex, but predictable, reflection characteristics. Asymmetric stretching could also be used to introduce, or change, the response to light of different polarizations.

In yet another embodiment, a skin with a reflective grating on the surface as shown in FIG. 2 is provided. The grating could be 1D, 2D or 3D in nature. Such a skin may consist of a nano-structured layer, or layers of ETFE. In an unperturbed state the skin could be transmitting. When stretched the dimension and periodicity of the grating will increase and could become more reflective. The skin may also be designed for the reverse behavior. These changes could be gradual or stepped in their response. When the skin is flexed it can be simultaneously stretched or compressed in various regions which can produce more complex, but predictable, AR characteristics. Asymmetric stretching could also be used to introduce, or change, the response to light of different polarizations.

Illustrative Applications

Various use cases will be briefly presented below describing various applications in which mobile systems having a tunable optically AR skin may be employed.

1. A mobile system may include a tunable AR skin for optimizing the performance of an underlying optical receiving device, including optical imaging, sensing or communications devices. The skin may be tuned, or set, to adjust the intensity, wavelength or intermittency of the transmitted light which enters the optical receiving device. For example the tuning point may be selected to optimize or enhance performance parameters such as the signal intensity and/or receiver sensitivity or to avoid saturation of the optical detector device.

2. A mobile system may include a tunable AR skin for on-board transmitter applications. In this embodiment the skin may be tuned to adjust the wavelength, intensity or intermittency of outgoing light or optical signals from an underlying optical source, such as an LED. This can be used to adjust performance parameters such as the transmitted wavelength and/or the intensity or range of an outgoing signal. For instance, in some cases it may be desirable to restrict the intensity and/or range of the outgoing signal for specific applications or safety requirements.

3. A mobile system may include a tunable AR skin for an underlying photovoltaic (PV) module. In this embodiment the skin may be tuned to adjust the intensity of incoming light of a given wavelength on an underlying photovoltaic cell or module. This adjustment may be used to optimize or enhance performance parameters that impact power system management to maximize, or limit, solar energy harvesting for better matching to the available storage capacity and/or usage.

4. A mobile system may include a tunable AR skin for "optical cloaking" or dynamic camouflage applications. In this embodiment the skin may be variably tuned over a sizeable area to adjust the contrast with its environment for the purpose of camouflage.

5. A mobile system may include a large area, tunable AR skin for underlying receiver or transmitter arrays. In this embodiment, the skin is used for arrays of underlying receivers or transmitters. The tuning may include uniform or different tuning for different sectors of the arrays.

6. A mobile system may include a large area, tunable AR skin for multiple, dissimilar underlying devices. In this embodiment the skin may be locally tuned to meet the performance requirements of the underlying optical receiving devices.

The processes performed by the analyzers/controllers described above may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips), optical disks (e.g., compact disk (CD), digital versatile disk (DVD)), smart cards, and flash memory devices (e.g., card, stick, key drive). However, computer readable storage media do not include transitory forms of storage such as propagating signals, for example.

The processes performed by the analyzers/controllers may also reflect the emergence and evolution of the internet of things (TOT), machine-to-machine (M2M) communications, artificial intelligence (AI) and machine learning.

In terms of IOT and M2M communications, the control communications may come via, or from, other platforms or machines, the control signals may also be distributed or duplicated to different mobile platforms to enable a collective response. For example control signals may be distributed to a plurality (e.g., a swarm) of UAVs or other mobile platforms. The possibility of coordinated AR behavior from the skins may add a level of capability in various applications for imaging, sensing, communications or other functionality.

In terms of AI and machine learning, the control system for individual or collective platform control may be either co-located on the mobile platform or remotely located and may have the ability to aggregate and/or adapt pre-programmed algorithms, or responses, as "learned behavior" in regard to the reflectivity control and tuning. Such learning may be based on the combination and analysis of multiple sensory inputs, for example environmental, proximity, solar irradiance, geolocation or other inputs, in combination with the base reflectivity analysis. In this way a mobile platform, or a plurality of mobile platforms, can be actively tuned or optimized to provide a higher level performance than may be achieved using only the measured or calculated AR behavior. Indeed, complex learned behaviors may be initiated in response to "circumstance recognition" based on a data base of previously established effects of actuated control, and/or their holistic effect for performance and operations. One example of such control would be the selection of an appropriate learned response to minimize interference or conflicts in communications, sensing, image recognition or other system functionality, between autonomous platforms, structures, terrains or environmental conditions.

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

In addition, it should be understood that the figures, which highlight the functionality and advantages of the present invention, are presented for illustrative purposes only. The architecture of the example aspect of the present invention is sufficiently flexible and configurable, such that it may be utilized (and navigated) in ways other than that shown in the accompanying figures.

Although example aspects herein have been described in certain specific example embodiments, many additional modifications and variations would be apparent to those skilled in the art. It is therefore to be understood that the various example embodiments herein may be practiced otherwise than as specifically described. Thus, the present example embodiments, again, should be considered in all respects as illustrative and not restrictive.

The invention claimed is:

1. A method for enhancing one or more optical performance parameters of an optical receiving device, comprising:
measuring a value of electromagnetic radiation of a given optical wavelength that is transmitted to an optical receiving device through at least one antireflective (AR) layer, the AR layer being at least partially transmissive to optical energy at one or more optical wavelengths, the at least one layer being substantially flexible and/or stretchable and having AR characteristics to incident electromagnetic radiation of a given wavelength which is selectively variable when flexed and/or stretched; and
based on the measured value of the electromagnetic radiation transmitted through the at least one AR layer, causing the AR layer to be flexed and/or stretched to thereby tune one or more AR characteristics of the AR layer to enhance one or more optical performance parameters of the optical receiving device.

2. The method of claim 1 further comprising tuning the one or more AR characteristics of the AR layer to enhance one or more performance parameters of the optical receiving device.

3. The method of claim 1 further comprising tuning the one or more AR characteristics of the AR layer to enhance remote optical imaging performed by the optical receiving device.

4. The method of claim 1 wherein the optical receiving device is an optical communication receiver and further comprising tuning the one or more AR characteristics of the AR layer to enhance performance of the optical communication receiver.

5. The method of claim 1 further comprising measuring the value of the electromagnetic radiation transmitted through the at least one AR layer using an optical monitoring device.

6. The method of claim 1 further comprising measuring the value of the electromagnetic radiation transmitted through the at least one AR layer using the optical receiving device.

7. The method of claim 1 wherein the optical receiving device is located on a mobile platform and the AR layer is a film or skin covering at least a portion of a surface of the mobile platform.

8. The method of claim 7 further comprising causing different portions of the film or skin to be flexed and/or stretched by different amounts to thereby impart different AR characteristics to the different portions of the film or skin.

9. A mobile system, comprising:
a self-supporting platform;
at least one anti-reflective (AR) layer disposed on and secured to the mobile platform, the at least one layer being at least partially transmissive to optical energy at one or more optical wavelengths, the at least one layer being substantially flexible and/or stretchable and having AR characteristics to incident electromagnetic radiation of a given wavelength which is selectively variable when flexed and/or stretched;
one or more actuators for flexing and/or stretching the at least one AR layer in response to receipt of a control signal; and
a controller for generating the control signal based on a measured value of the incident electromagnetic radiation of the given wavelength that is transmitted through the at least one AR layer.

10. The mobile system of claim 9 further comprising at least one optical receiving device located to receive the incident electromagnetic radiation that is transmitted through the at least one AR layer.

11. The mobile system of claim 10 wherein the at least one optical receiving device is located between the at least one AR layer and the one or more actuators.

12. The mobile system of claim 10 wherein the at least one optical receiving device is configured to measure the transmittance of the incident electromagnetic radiation and provide the measured value to the controller.

13. The mobile system of claim 9 wherein the one or more actuators are configured to cause the AR characteristics of the at least one AR layer to be dynamically tuned by flexing and/or stretching the at least one AR layer in response to the control signal being dynamically adjusted based on sequential measurements of the measured value of the transmittance of the at least one AR layer.

14. The mobile system of claim 9 wherein the one or more actuators are selected from the group consisting of thermal, piezo-electric, magnetic, electro-active, pneumatic and hydraulic activated devices.

15. The mobile system of claim 9 wherein the self-supporting platform is selected from the group consisting of an Unmanned Aerial Vehicle (UAV), an Unmanned Marine Vehicle (UMV), an Unmanned Ground Vehicle (UGV) or a wearable platform.

16. The mobile system of claim 9 further comprising an optical monitor located on the platform for monitoring the transmittance of the at least one layer and providing the measured value of the transmittance to the controller.

17. The mobile system of claim 9 wherein the optical receiving device is an optical imaging device and the controller is configured to generate the control signal so that the transmittance of the at least one layer is tuned to enhance optical imaging of the mobile system.

18. The mobile system of claim 9 wherein the optical receiving device is an optical communication receiver.

19. The mobile system of claim 18 wherein the controller is configured to generate the control signal so that the transmittance of the at least one AR layer is tuned to enhance the performance of the optical communication receiver.

20. The mobile system of claim 18 wherein the optical communication receiver includes a photovoltaic device.

21. The mobile system of claim 9 further comprising an optical transmitter underlying the at least one AR layer.

22. The mobile system of claim 21 wherein the controller is configured to generate the control signal so that the transmittance of the at least one AR layer is tuned to enhance the performance of the optical transmitter.

23. The mobile system of claim 9 wherein the one or more actuators includes a plurality of actuators for flexing and/or stretching different portions of the at least one AR layer independently of one another, the controller being configured to provide different control signals to the different actuators.

24. The mobile system of claim 9 further comprising one or more optical monitors remotely located from the platform for monitoring the transmittance of the at least one AR layer and providing measured value(s) of the transmittance to the controller.

25. The mobile system of claim 9 wherein the controller is further configured to generate the control signal based on coordination with one or more additional mobile platforms that have a tunable AR layer.

26. The mobile system of claim 9 wherein the controller is further configured to generate the control signal based on machine-to-machine communication with at least one device remotely located from the mobile platform.

27. The mobile system of claim 9 wherein the controller is further configured to generate the control signal by accessing a data base of previously learned responses to adjustments of the AR characteristics of the at least one AR layer.

28. The method of claim 1 further comprising calculating a value of transmittance or reflectance of the AR layer using a calibrated light source.

29. A method for enhancing one or more optical performance parameters of an optical receiving device, comprising:

measuring one or more optical performance parameters of an optical receiving device that receives an optical signal that is transmitted to the optical receiving device through at least one antireflective (AR) layer, the AR layer being at least partially transmissive to optical energy at one or more optical wavelengths, the at least one layer being substantially flexible and/or stretchable and having AR characteristics to incident electromagnetic radiation of a given optical wavelength which is selectively variable when flexed and/or stretched; and based on measured values of the one or more optical performance parameters, causing the AR layer to be flexed and/or stretched to thereby tune one or more AR characteristics of the AR layer to enhance the one or more optical performance parameters of the optical receiving device.

* * * * *